United States Patent
Sirmalis et al.

(10) Patent No.: US 6,411,565 B1
(45) Date of Patent: Jun. 25, 2002

(54) MULTI-USE TORPEDO DISPENSED SINGLE MODE OPTICAL FIBER

(75) Inventors: John E. Sirmalis, Barrington; Bernard J. Myers, Bristol, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/853,936

(22) Filed: May 11, 2001

(51) Int. Cl.[7] .................. H04B 11/00; F42B 19/01
(52) U.S. Cl. ................ 367/131; 367/129; 114/21.1
(58) Field of Search ................ 367/129, 130, 367/131, 153, 154, 149; 340/850; 114/242, 312, 316, 21.1, 20.1

(56) References Cited

U.S. PATENT DOCUMENTS

| | | | |
|---|---|---|---|
| 5,419,512 A | * | 5/1995 | Holzschuh et al. ......... 244/3.12 |
| 5,734,623 A | * | 3/1998 | Ruffa ......................... 367/131 |
| RE36,643 E | * | 4/2000 | Olson et al. ................ 367/131 |
| 6,088,297 A | * | 7/2000 | Stottlemyer ................ 367/131 |

* cited by examiner

Primary Examiner—Ian J. Lobo
(74) Attorney, Agent, or Firm—Michael J. McGowan; James M. Kasischke; Prithvi C. Lall

(57) ABSTRACT

A system is provided in which a torpedo is launched from a submarine and pays out an optical fiber as it moves away from the submarine towards a target. The optical fiber is attached to the submarine and provides an optical communications link between the submarine and the torpedo. In addition to carrying communications between the submarine and torpedo, the optical fiber includes optical acoustic sensors. The optical fiber serves as a forward deployed acoustic array to gather target bearing and range data that is processed at the submarine. With the array deployed directly within the engagement arena, the submarine can more accurately analyze the acoustic environment to better guide the torpedo through countermeasure avoidance and to target acquisition. The optical fiber pays out behind the torpedo at the same rate that the torpedo moves away from the submarine. Thus, the optical fiber does not move in relation to the surrounding medium and flow noises experienced in conventional towed arrays are virtually eliminated from the array of optical acoustic sensors.

10 Claims, 1 Drawing Sheet

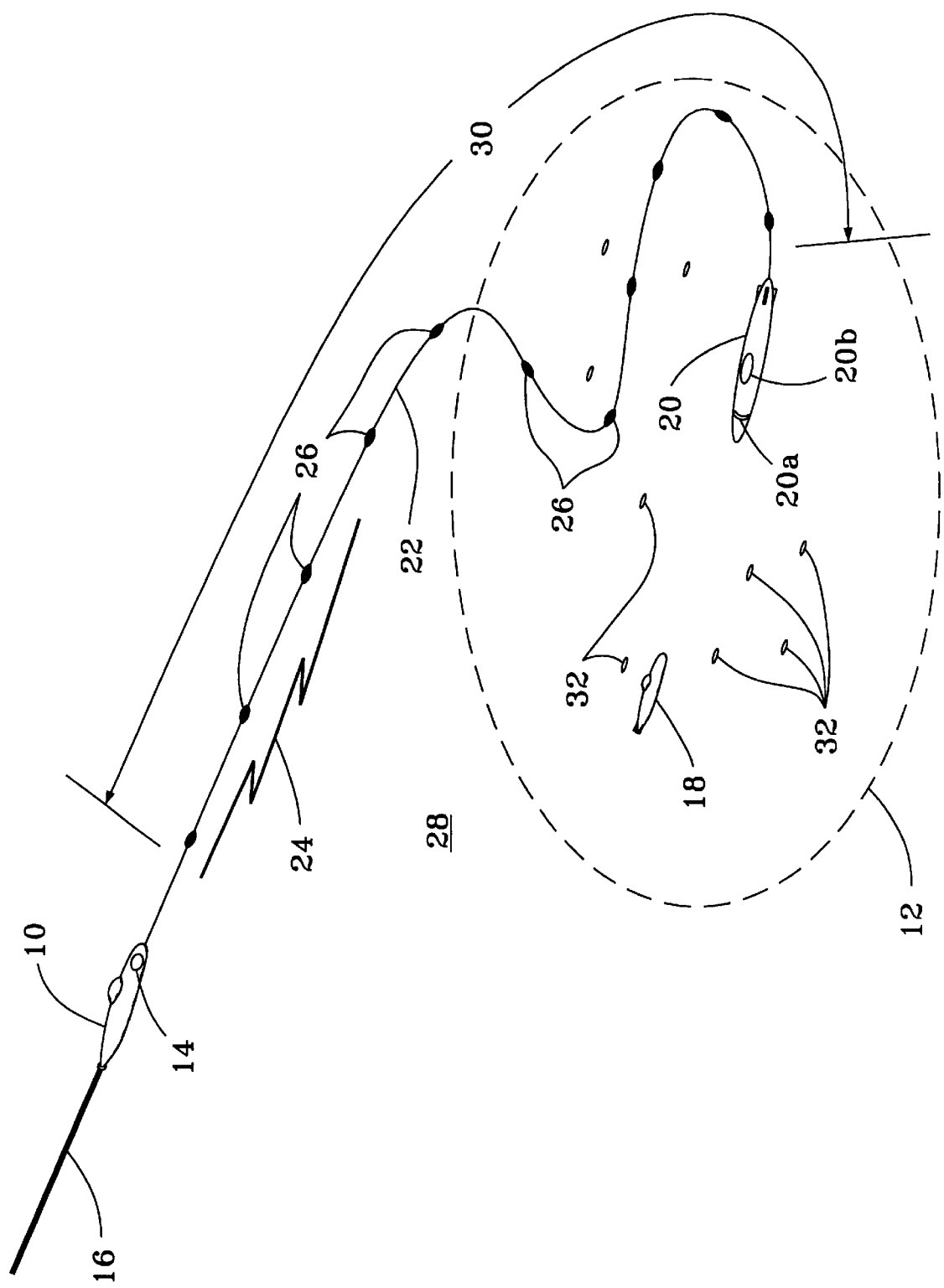

MULTI-USE TORPEDO DISPENSED SINGLE MODE OPTICAL FIBER

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

There are no related patent applications.

BACKGROUND OF THE INVENTION (1) Field of the Invention

The present invention relates generally to acoustic arrays, and more particularly to a fiber optic acoustic array towed from a torpedo and connected to the launching platform for the torpedo.

(2) Description of the Prior Art

During hostile encounters, a submarine has to establish a target's bearing, and range in the shortest time frame possible. To do so, the submarine will typically let out an acoustic array along a length of tow cable to obtain the acoustic signature of the target. Current improvement efforts for such towed arrays seek to replace the electromechanical hydrophones and cable of these arrays with fiber optical acoustic sensors and cable.

Once the towed array is deployed, the submarine maneuvers in a zigzag pattern in order to obtain sufficient bearing and range information for target acquisition. However, depending on the signal to noise ratio of an acquired signal, target acquisition in this manner may take a considerable mount of time, sometimes on the order of hours. During this time, the submarine is vulnerable to attack by the target or other hostile platform.

Once the target is acquired, a torpedo may be launched from the submarine toward the target. Modern torpedoes are wire-guided and use copper wire for two-way communication between the submarine and the torpedo. Using its onboard and towed array sensors, the submarine continues to obtain and process acoustic signals from the engagement arena. The submarine then provides guidance commands to the torpedo through the copper wire. Typically, the engagement arena will contain numerous countermeasures deployed at the target to thwart the torpedo's attainment of the target. In this noisy environment, complicated by the submarine's physical separation from the engagement arena, the submarine's sensors may not provide sufficient data to separate countermeasure noise from target signatures. Thus, guidance of the torpedo may be inadequate for the torpedo to successfully acquire the target.

Thus, it can be seen that the sooner a torpedo may be launched at a potential target, the greater the margin of safety for the submarine. Also, sensors deployed within the engagement arena will improve signal acquisition, signal processing and torpedo guidance such that the torpedo can successfully engage the target.

SUMMARY OF THE INVENTION

Accordingly, it is an object of the present invention to provide a system to obtain acoustic bearing and range data from within an engagement arena for a target in the arena.

Another object of the present invention is to provide a system for target acquisition that provides for early launch of torpedo towards the target.

Still another object of the present invention is to provide a system for guiding a torpedo to a target based on target bearing and range data obtained within the engagement arena.

Other objects and advantages of the present invention will become more obvious hereinafter in the specification and drawings.

In accordance with the present invention, a system is provided in which a torpedo is launched from a submarine towards a target based on minimal target bearing and range data obtained from a submarine's onboard or towed acoustic sensors. The target and range data necessary for torpedo launch need only be rough approximations of the target's position based on data from a few sensors. The torpedo is of the well-known wire-guided type, with the prior art copper wire and related receiving/transmitting equipment being replaced with a monofilament optical fiber and fiber optic receivers/transmitters. In addition to carrying communications between the submarine and torpedo, the optical fiber includes optical acoustic sensors. Thus, as the optical fiber pays out behind the torpedo, an acoustic array is formed. Because the optical fiber pays out at the same rate that the torpedo moves away from the submarine, the optical fiber does not move in relation to the surrounding medium. Thus the flow noises experienced in conventional towed arrays are virtually eliminated from the array of optical acoustic sensors.

The optical fiber serves as a forward deployed acoustic array to gather target bearing and range data that is processed at the submarine. With the array deployed directly within the engagement arena, the submarine can more accurately analyze the acoustic environment to better guide the torpedo through countermeasure avoidance and to target acquisition. With improved inertial guidance and motion tracking, the torpedo may also be guided through a zigzag pattern, or dogleg, to further enhance target and countermeasure bearing data.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying figure showing a schematic representation of the system of the present invention including a torpedo launched from a submarine and connected to the submarine by a fiber optic link.

DESCRIPTION OF THE PREFERRED EMBODIMENT

Referring now to the figure, submarine 10 is shown remote from an engagement arena 12. In a typical scenario, submarine 10 has obtained acoustic data from onboard sensors 14 and towed array 16 that indicates the presence of threat, or target, 18 within arena 12. The data obtained may be insufficient to positively define either the range or bearing of target 18 from submarine 10. However, the data will be sufficient to provide a best estimate of range and bearing such that torpedo 20 can be launched from submarine 10 towards target 18. In a manner similar to well-known wire-guided torpedoes, torpedo 20 pays out optical fiber 22 as it moves away from submarine 10. Optical fiber 22 provides an optical communications link between submarine 10 and torpedo 20, as illustrated by lines 24. Such optical communications links are well known as are the necessary optical transmitting and receiving equipment aboard submarine 10 and torpedo 20.

Additionally, optical fiber 22 includes a series of optical acoustic sensors, schematically illustrated and denoted as 26 in the figure. As with the optical communications link, optical acoustic sensors 26 are well known in the art and sensors 26 may include one or more types of optical acoustic sensors, such as Bragg gratings, formed in fiber 22. Data from sensors 26 is returned to either submarine 10 or torpedo 20 for processing via the optical communications link of fiber 22. Well known wave front curvature techniques can then be utilized to obtain range to target information. Optical fiber 22 pays out from torpedo 20 at the same rate that torpedo 20 moves away from submarine 10. Thus, the deployed optical fiber 22 has no movement relative to the surrounding medium 28 and is not subject to flow noise as are onboard sensors 14 and towed array 16 when submarine 10 maneuvers to obtain additional acoustic data.

With the system of the present invention, submarine 10 need not perform the typical zigzag maneuvering required to obtain adequate target bearing and range data. As noted previously, once the data is sufficient to obtain a best estimate for the target bearing and range, the submarine 10 may launch torpedo 20 and then remain quiescent. In this state, onboard sensors 14 and towed array 16 of submarine 10 provide data with improved signal to noise ratios. Additionally, the optical acoustic sensors 26 along the length of optical fiber 22 provide a forward deployed, low noise, acoustic array, denoted as 30 in the figure. The improved data from onboard sensors 14 and towed array 16, together with the additional data from sensors 26 (array 30), allows submarine 10 to more precisely determine the bearing and range of target 18, so as to more accurately guide torpedo 20 to target 18 via the optical communications link of fiber 22. As torpedo 20 enters arena 12, array 30 is deployed closer to target 18, further improving the determination of the bearing and range of target 18 by submarine 10. The location of each of the array sensors 26 is kept track of as part of the sensor data package as torpedo 10 moves through medium 28. The location data is used in the formation of array beams and in processing the sensor 26 data.

Target 18, or some other hostile platform (not shown), may deploy countermeasures 32 into arena 12, so as to confuse torpedo 20, attract torpedo 20 to a false target, or otherwise attempt to deviate torpedo 20 away from target 18. With the improved acoustic data being received by submarine 10, submarine 10 can better guide torpedo 20 through the field of countermeasures 32 and towards target 18. Further, the maneuvering of torpedo 20 through the field of countermeasures 32 may provide somewhat orthogonal arrays, which also assist in determining target 18's true bearing and range.

The invention thus described provides a multi-use, torpedo 20 dispensed, single mode optical fiber 22 for communications between submarine 10 and torpedo 20. Fiber 22 further provides a forward deployed acoustic array 30, which may be positioned within a hostile engagement arena 12 to provide additional acoustic data for targets 18 and countermeasures 32 that may be within arena 12. Further, the high bandwidth of optical fiber 22 allows for simultaneous communications between torpedo 20 and submarine 10, sensor 26 data transmission and beamforming for array 30.

Although the present invention has been described relative to a specific embodiment thereof, it is not so limited. As an example, sensors 26 of optical fiber 22 may include additional types of sensors, such as temperature sensors, pressure sensors, strain sensors and the like. Torpedo 20 may also include a range of sensors 20a and/or inertial guidance and processing equipment 20b, so as to provide additional data relative to its surroundings, its location with respect to submarine 10 and the locations of sensors 26. Additionally, submarine 10 may be any platform capable of launching torpedo 20, processing data obtained from sensors 14 and arrays 16 and 30 and providing guidance to torpedo 20 via the communications link of fiber 22. Further, torpedo 20 may be any underwater vehicle capable of paying out optical fiber 22. Still further, equipment 20b may provide signal processing capabilities to torpedo 20, such that torpedo 20 may discern the location of target 18.

Thus, it will be understood that many additional changes in the details, materials and arrangement of parts, which have been herein described and illustrated in order to explain the nature of the invention, may be made by those skilled in the art within the principle and scope of the invention as expressed in the appended claims.

What is claimed is:

1. A system providing a forward deployed acoustic array comprising:

an underwater vehicle launched from a platform;

an optical fiber dispensed from the underwater vehicle and forming a communication link between the underwater vehicle and the platform; and optical sensors spaced on the optical fiber such that least two sensors on the dispensed optical fiber are acoustic sensors forming an acoustic array for gathering acoustic signals from the medium surrounding the optical fiber, wherein:

the acoustic signals from the sensors are processed to determine range and bearing information of a target; and the underwater vehicle is directed towards the target based on the determined range and bearing information.

2. The system of claim 1, wherein the direction of the underwater vehicle results in the optical fiber forming somewhat orthogonal arrays of sensors to better determine the range and bearing information of the target.

3. The system of claim 1, wherein the underwater vehicle further comprises inertial guidance equipment in communication with the platform via the communication link to provide the platform with information on a location of the vehicle.

4. The system of claim 2, wherein the underwater vehicle further comprises inertial guidance equipment in communication with the platform via the communication link to provide the platform with information on a location of the vehicle.

5. The system of claim 4, wherein the optical sensors further comprise at least one of temperature, pressure and strain sensors.

6. The system of claim 5, wherein the optical sensors comprise Bragg gratings.

7. The system of claim 1, wherein:

the platform processes the acoustic signals; and the platform communicates guidance commands to the underwater vehicle via the communications link to direct the underwater vehicle.

8. The system of claim 1, wherein the platform processes the acoustic signals and is self-directed towards the target.

9. The system of claim 8, wherein the underwater vehicle further comprises inertial guidance equipment to provide the underwater vehicle with information on a location of the vehicle and locations of the sensors.

10. The system of claim 9, wherein:

at least three sensors on the dispensed optical fiber are acoustic sensors forming an acoustic array; and the acoustic signals are processed in accordance with the wave front curvature technique.

* * * * *